March 12, 1940.  E. K. THOMAS  2,193,352
TRAILER
Filed May 10, 1938  8 Sheets-Sheet 3

INVENTOR
Edward K. Thomas
BY
Blair, Curtis, Dunne + Hayward
ATTORNEYS

March 12, 1940. E. K. THOMAS 2,193,352
TRAILER
Filed May 10, 1938 8 Sheets-Sheet 4

INVENTOR
Edward K. Thomas
BY
Blair, Curtis, Dunne & Hayward
ATTORNEYS

March 12, 1940.  E. K. THOMAS  2,193,352
TRAILER
Filed May 10, 1938   8 Sheets-Sheet 6

INVENTOR
Edward K. Thomas
BY
Blair, Curtis, Dunne & Hayward
ATTORNEYS

March 12, 1940.  E. K. THOMAS  2,193,352
TRAILER
Filed May 10, 1938    8 Sheets-Sheet 7
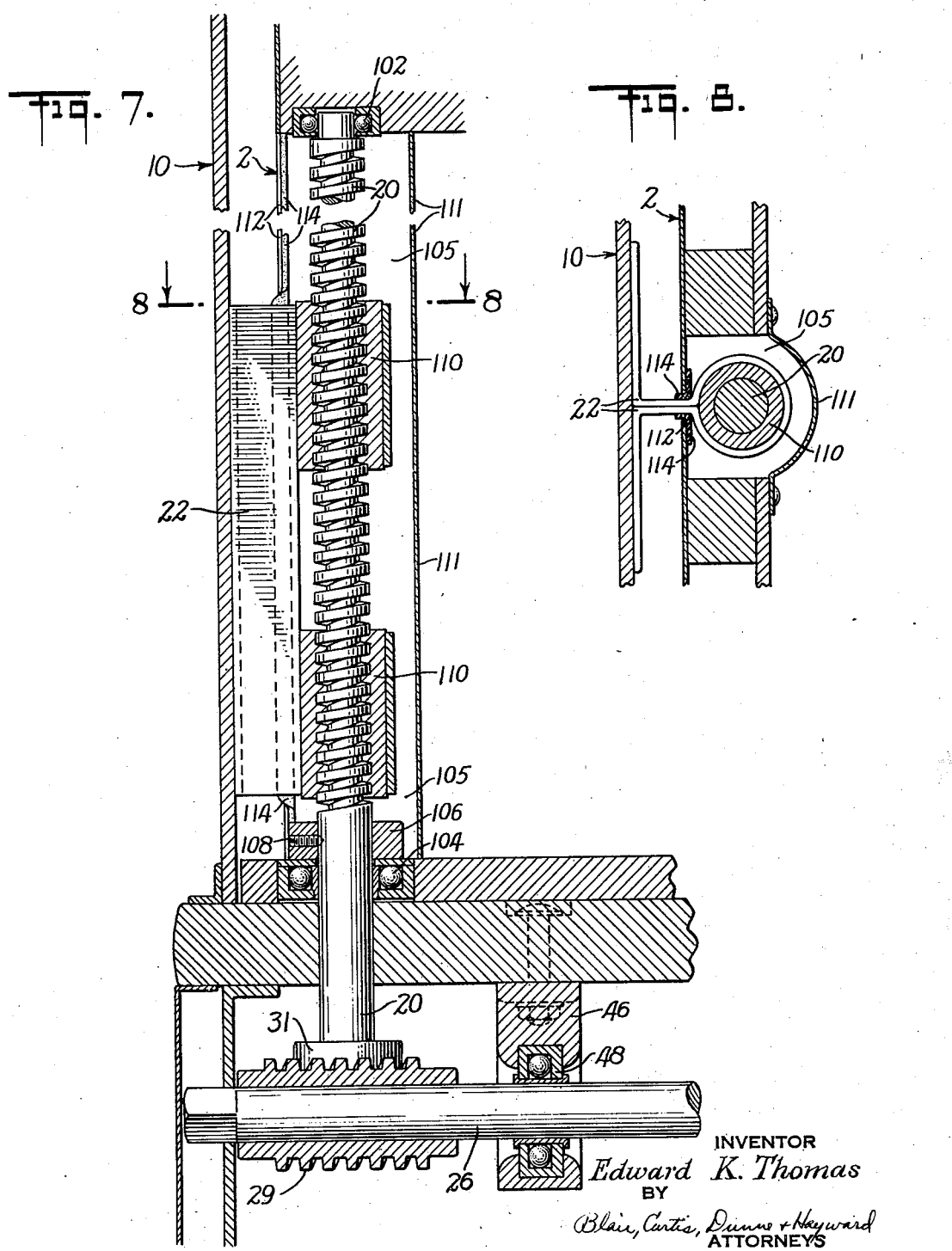

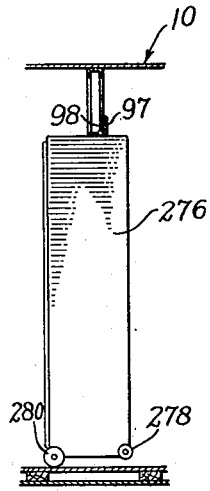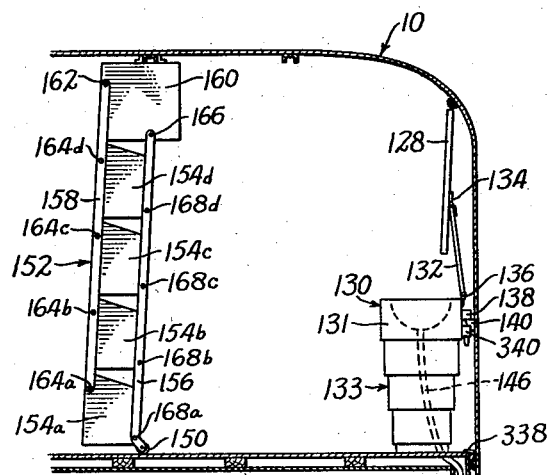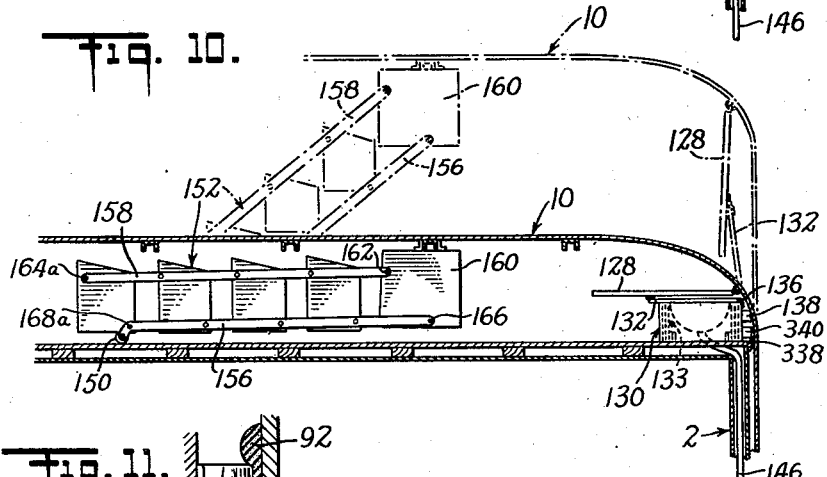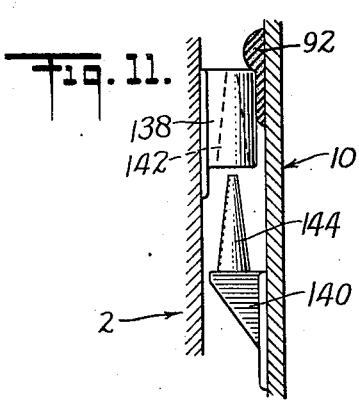

Patented Mar. 12, 1940

2,193,352

UNITED STATES PATENT OFFICE 2,193,352

TRAILER

Edward K. Thomas, Miami, Fla.

Application May 10, 1938, Serial No. 206,971

22 Claims. (Cl. 296—23)

This invention relates to living quarters of limited dimensions and the equipment therefor, and, more in particular, to movable living quarters of the vehicle type.

An object of this invention is to provide living quarters and equipment of simple and durable construction which are adequate in use but which may be confined to a small space when desirable. Another object is to provide living quarters and equipment which are light in weight and thoroughly practical in construction. Another object is to provide living quarters and equipment of the above character which may easily be transported from one place to another.

These, and other objects, will be in part obvious and in part pointed out hereinafter. In the drawings in which one embodiment of my invention is shown:

Figure 2A is an enlarged detail of a portion of the porch construction;

Figure 7 is a detailed view of a portion of the elevating mechanism;

Figure 8 is a horizontal sectional view on the lines 8—8 of Figure 7;

Figure 9 is a vertical sectional view showing the details of construction of the collapsible wash stand and the chest of drawers in the upper compartment;

Figure 10 is a view similar to Figure 9 but showing the various units in the nested position;

Figure 11 is a detail view of one type of interengaging lug construction; and

Figure 12 is a view of a modified cabinet construction.

Figure 1:
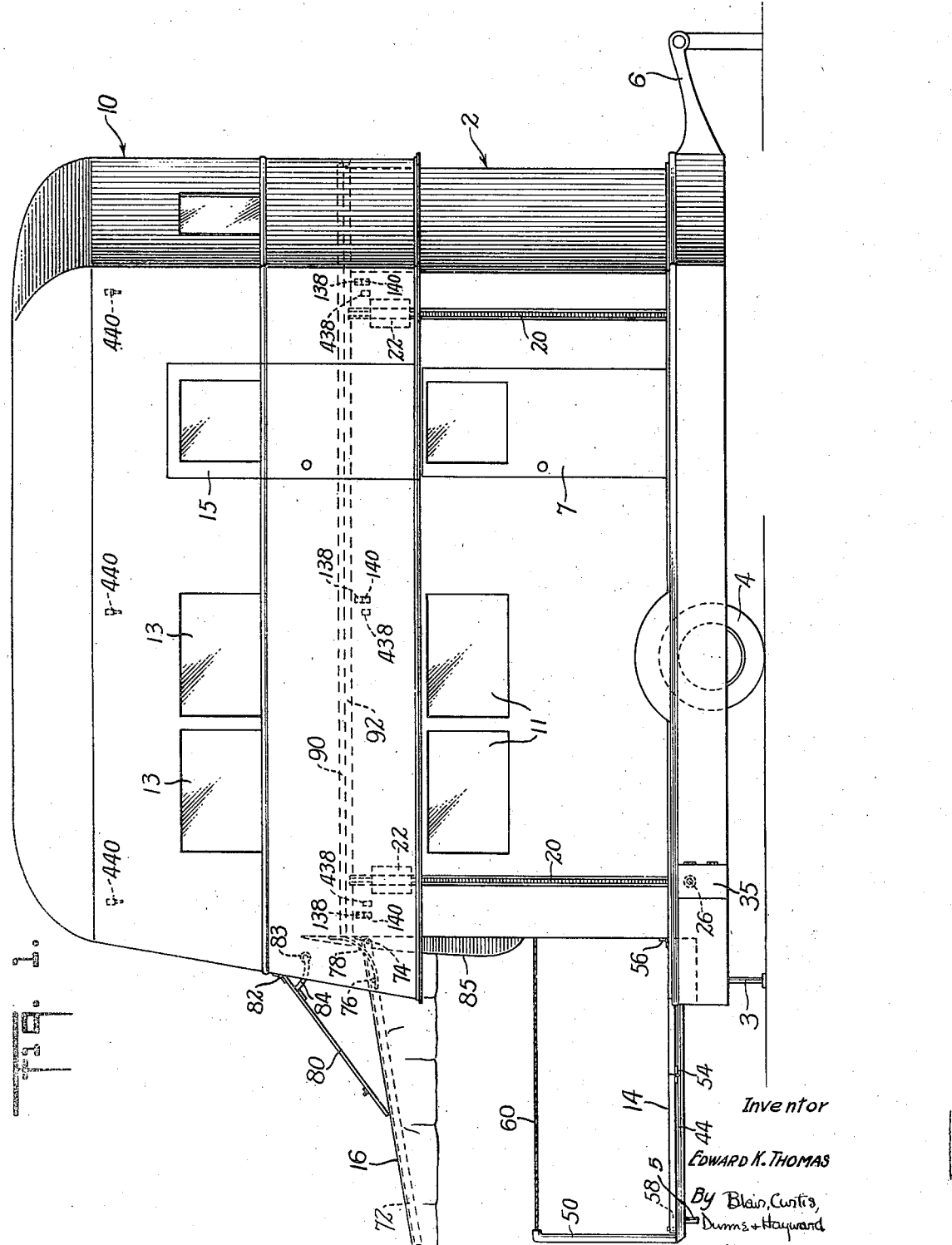
Figure 1 is a side view of my trailer with the upper shell portion thereof raised and the various pieces of equipment extended for use.
Figure 5:
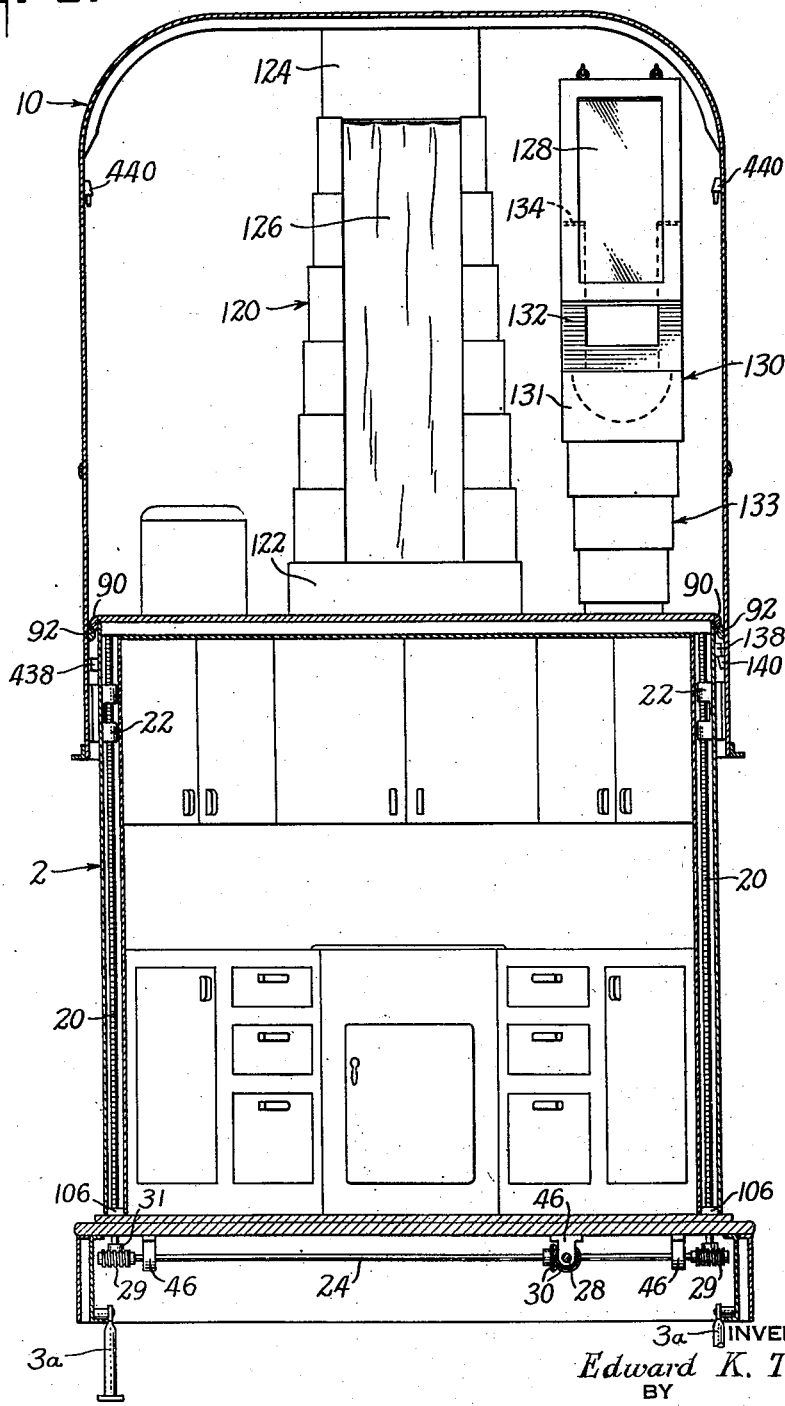
Figure 5 is a sectional view on the lines 5—5 of Figure 2.

Referring to Figure 1 of the drawings, a main body portion 2 is supported near its center by a pair of wheels 4 and at its forward end by a tongue or draw-bar 6. In this embodiment a pair of adjustable legs 3 is provided, one at each of the rear corners of the main body portion 2; these adjustable legs are hinged at their upper ends to the frame and are raised and clamped in a horizontal position during the time the trailer is being transported. In Figure 5 additional legs 3a are shown at the front corners of the trailer. The main body portion 2 forms the main supporting structure and at the same time provides the lower room designated by the numeral 8 (see Figure 2). Mounted upon this main body portion is an upper shell 10 which may be elevated to the position shown in Figures 1 and 2 from the position shown in Figure 3 to form an upper room or chamber generally designated by the numeral 12 (Figure 2).

Figure 2:
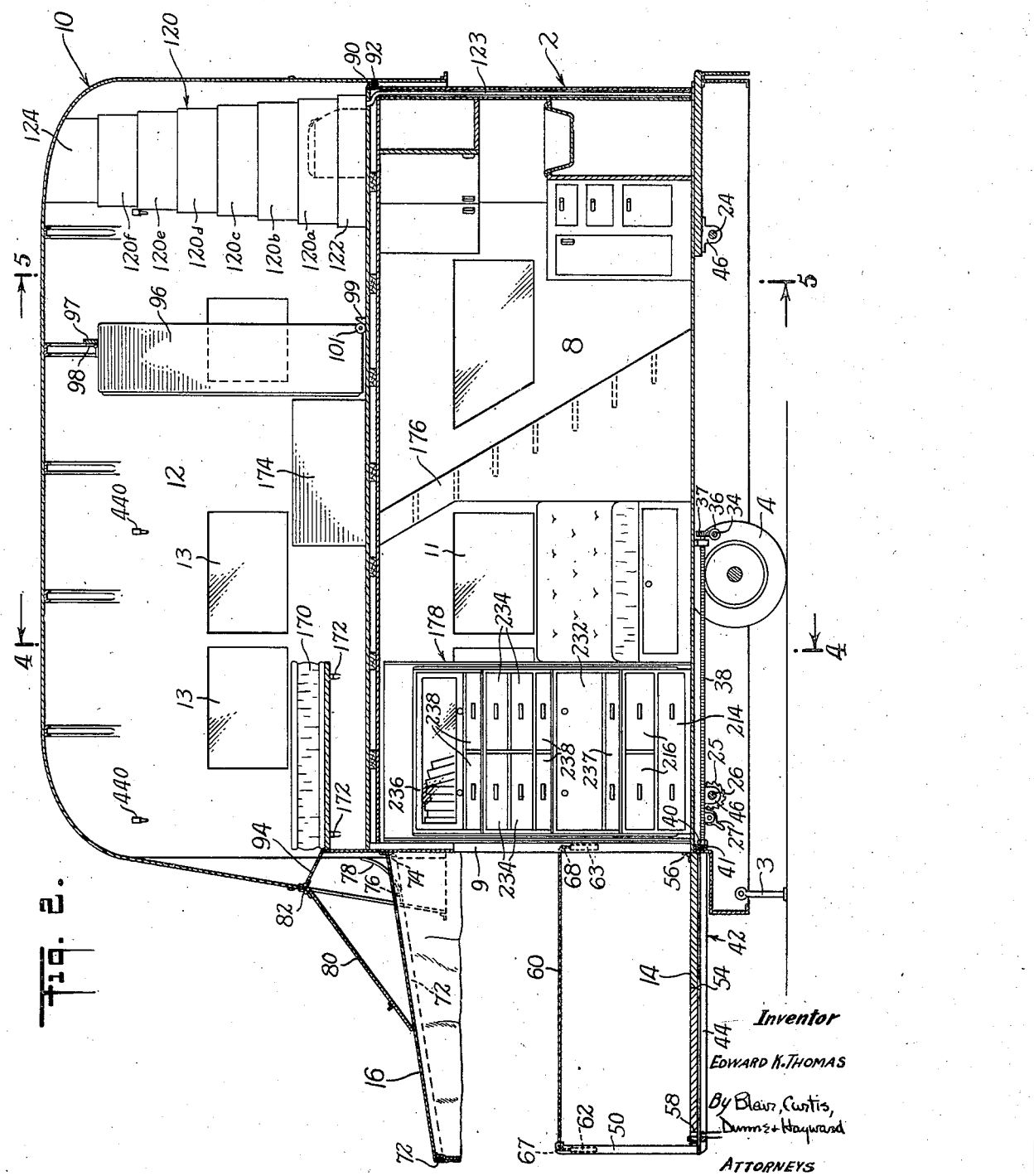
Figure 2 is a horizontal sectional view showing the interior thereof.

As shown at the left of Figures 1 and 2 a rear porch is provided having a folding floor 14 and an awning structure 16. The porch structure and the various other units of equipment are so related to the main body portion and the upper shell that they will be properly positioned for use when the upper shell is elevated. Depending from the outside corners of the porch are two adjustable legs 5, similar to legs 3. Legs 5 are hinged at their upper ends so that they may be folded up under the frame during movement of the trailer and lowered to assist in supporting the extended porch when the upper shell is elevated.

Figure 6:
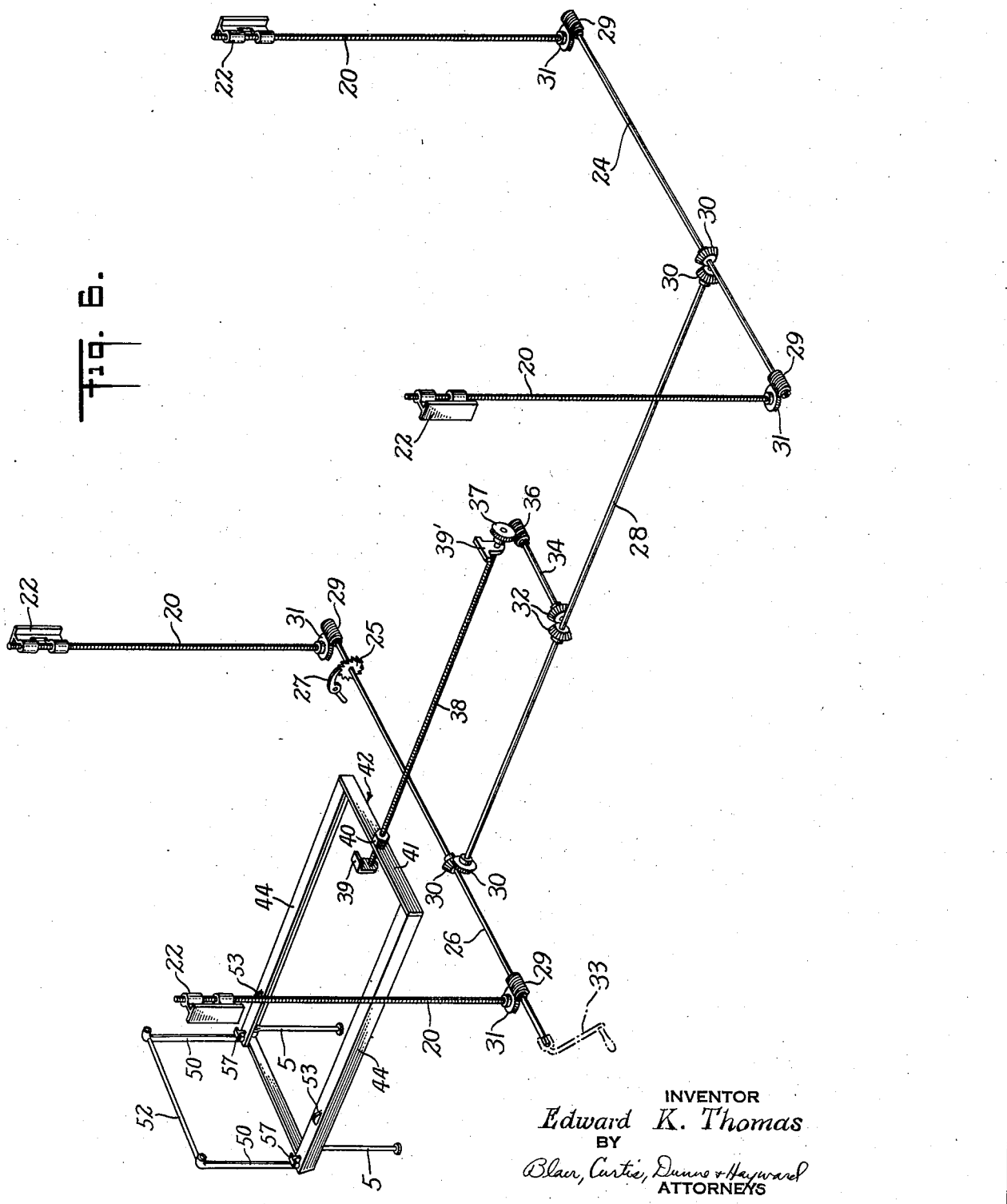
Figure 6 is a skeleton perspective view showing the elevating mechanism for the upper shell.

The means for elevating the upper shell is best shown in Figure 6 and includes four vertically extending male screws 20 mounted upon the main body portion, each of which cooperates with an elevating lug 22 fixed to the upper shell. A shaft and gear structure is provided for rotating the vertical shafts simultaneously so that the upper shell may be raised or lowered as desired. This shaft and gear structure comprises a front horizontal shaft 24 and a rear horizontal shaft 26, each of which is mechanically connected to a longitudinal shaft 28 by a pair of interengaging bevel gears 30; a worm gear unit comprising a worm 29 and a cooperating gear 31 connects each of shafts 24 and 26 to two of the vertical screws 20. The elevating mechanism is operated by a removable hand-crank 33 upon the end of horizontal shaft 26. In this manner horizontal shafts 24 and 26 are connected by gearing in the ratio of one-to-one, and, thus, when shaft 26 is turned by means of hand-crank 33, worms 29 all move at the same rate so that the upper shell is elevated or lowered in a uniform manner at its four corners. A suitable ratchet wheel 25 and a cooperating dog 27 is provided to lock the gear mechanism. Referring to Figure 7, shafts 24, 26, and 28 are supported by a plurality of brackets 46 (only one of which is shown) extending downwardly from the floor of the main body portion, each of which carries a ball-bearing unit 48. As shown in Figure 1, the crank receiving end of shaft 26 is covered by a locked door 35.

As pointed out above, the means for extending and supporting the porch is operated at the same time that the upper shell is being elevated. For this purpose, near the center of longitudinal shaft 28 (Figure 6), and mechanically connected thereto by means of a pair of bevel gears 32, is a shaft 34 which in turn is mechanically connected by a worm 36 and a cooperating gear 37 to a rotatable horizontal male screw 38. Screw 38 is supported at its ends and held from moving longitudinally by brackets 39' and 39. Mounted upon male screw 38 (Figure 6) is a hexagonal nut 40 which is welded to a U-shaped porch supporting frame 42. Porch supporting frame 42 is formed by a cross-bar 41 and a pair of angle bars 44 which are moved outwardly by nut 40 to the position shown when lugs 22 and the upper shell are moved upwardly. In the present embodiment shaft 34 is connected to shaft 28 by gearing in a ratio of one-to-one and worm 36 is of a pitch to fully extend porch supporting frame 42 by the time that lugs 22 have carried upper shell 10 to its upper position. Angle bars 44 are slidably supported in slots in the frame structure and, when in the extended position shown in Figure 1 and cooperate with adjustable legs 5 to form a rigid support for the porch floor 14.

Rigidly carried by the outer ends of angle bars 44 is a vertically positioned porch railing which comprises a pair of upwardly extending posts 50 and a horizontal bar 52. The porch floor 14 is divided in two sections which are connected together at their adjacent edges by hinges 54, the right-hand section being connected by hinges 56 to the main body portion of the trailer and the left-hand section having slots 58 which receive upwardly extending T-members 57 carried on the ends of angle bars 44. As shown in Figure 2A, near the outer end of each bar 44 is mounted a cam lug 53 which normally fits into a correspondingly shaped recess 55 in the bottom of a sill forming a part of floor 14; the function of these cam lugs will be pointed out below.

Side railings for the porch are provided by two ropes 60, each of which is provided with a weight 62 at one end which is positioned in one of posts 50. At the upper end of each of these posts is a bracket carrying a pulley 67 over which the corresponding rope 60 extends. The opposite end of each rope 60 extends over a corresponding pulley 68 and carries a weight 63. When the porch is in the extended position, weights 62 and 63 abut the brackets of their corresponding pulleys so as to hold ropes 60 taut. When the porch is moved to the collapsed position shown in Figure 3, weights 62 and 63 move downwardly pulling ropes 60 to the position shown.

Awning 16 (see also Figure 2) is carried by a U-shaped frame 72 which is pivoted near the top of the main body portion of the trailer at 74. Extending outwardly from each side of frame 72 is a pin 76 and carried by the upper shell structure in vertical alignment with each of these pins is a curved bracket 78. The lower portion of the back wall of the upper shell is formed by a lid 80 which is supported at its upper edge by a plurality of hinges 82. Extending through a slot in upper shell (Figure 1) at the side of lid 80 and carried by lid 80 is an arm 84. Arm 84 carries a roller 83, which rides upon a vertically extending track 85. When shell 10 is moved from the nested position of Figure 3 to the extended position of Figure 1, roller 83 cooperates with track 85 to swing lid 80 outwardly and then holds it free of the units collapsed beneath it. However, in this embodiment, when the shell is in the upper position lid 80 is held in the position shown by the awning frame 72, and provides protection for the awning and affords a protected opening to the upper chamber of the trailer.

Figure 3:
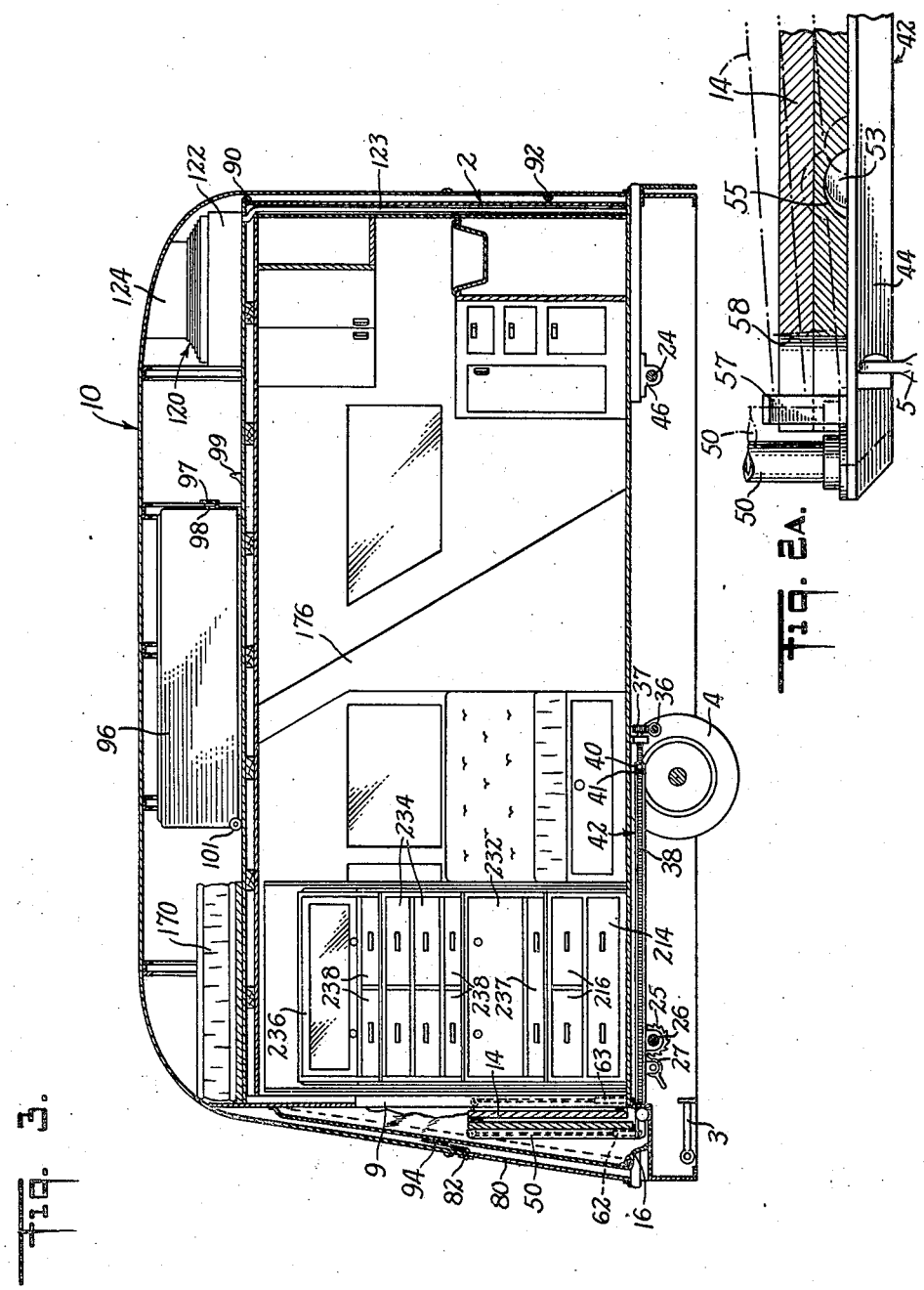
Figure 3 is a view similar to Figure 2 with the upper shell and the various units of equipment nested so that the trailer may be transported.

When the upper shell is moved to its lower position as shown in Figure 3, the porch and the awning are folded and entirely concealed between the rear walls of the main body portion 2 and the upper shell 10 and lid 80 moves down flush with the upper shell walls. As best shown in Figure 2A, T-members 57 on the ends of angle bars 44 are normally positioned at the left ends of slots 58. Thus, when angle bars 44 start moving inwardly the T-members move to the right in their slots for a short distance before they contact porch floor 14. During this small movement cam lugs 53 are moved to the right and move out of their recesses 55, and floor 14 is lifted, as shown in broken lines, and swung upwardly about its hinges 56 (Figure 2). With floor 14 thus swung upwardly, as angle bars 44 move further to the right the T-members contact the left-hand side of floor 14 and exert pressure thereon, folding the floor to the position shown in Figure 3. At the same time weights 62 and 63 pull ropes 60 inwardly and awning 16 moves downwardly due to gravity; thus, these units are totally enclosed in the manner shown.

Referring to the right-hand side of Figures 2 and 3, along the top edge of the main body portion is a sealing bead 90 of material such as reinforced soft rubber, and positioned upon the inside of the upper shell is a similar bead 92. These beads extend along the sides and front of the trailer (see also Figures 4 and 5), and when the upper shell is elevated they cooperate to effectively seal the upper chamber.

As an additional means for holding upper shell 10 rigid when it is in the elevated position, three interengaging bracket constructions are provided along each side wall. These bracket constructions are of the type shown in Figure 11, there being a female bracket 138, mounted upon the side wall of the lower shell 2 below bead 90, and a male bracket 140 mounted upon upper shell 10. Bracket 138 is provided with a tapered vertical hole 142, and bracket 140 is provided with a pin 144 tapered to fit hole 142. When upper shell 10 is in the nested position brackets 138 and 140 are disengaged, but when shell 10 is moved upwardly and approaches the fully elevated position, pins 144 approach and enter holes 142. Thus, when the shell is in the fully elevated position, brackets 138 and 140 are rigidly interengaged, and with these bracket constructions positioned on the side walls with one bracket construction adjacent to each corner, there is no tendency for the upper shell to move with respect to lower shell 2.

Bead 92 is sufficiently flexible to pass brackets 138 without difficulty. However, when desirable, bead 92 may be cut away at the point where it passes bracket 138, and bead 90 may be sufficiently widened at this point to insure a proper sealing relationship between the two beads.

A means is provided for holding the upper shell rigid when it is in the nested position; this means comprises three bracket constructions along each side wall, the bracket constructions being of the type shown in Figure 11, but they are inverted. As shown at the left of Figure 5, the bracket 438 of each set is mounted upon the lower shell below bead 90, and the bracket 440 is mounted near the top of the inner walls of upper shell 10. Referring to Figure 1, brackets 438 and 440 are positioned at the side of brackets 138 and 140, so that they will not interfere with each other. When the upper shell is moved to the nested position, brackets 438 and 440 move into engaging relationship and hold the upper shell rigid with respect to the lower shell. Bead 90 is sufficiently flexible to permit brackets 440 to pass it without difficulty.

At the rear of the trailer, adjacent the upper edge of lid 80 (see Figure 2), is hinged a sealing flap 94. Flap 94 is rigid with a sealing bead at its edges and extends substantially the full width of the trailer between upper shell 10 and lower shell 2. When upper shell 10 moves downwardly to the position shown in Figure 3, flap 94 automatically moves to the position there shown. When upper shell 10 is is in the elevated position flap 94 may be lifted to provide ventilation for the upper chamber 12.

Certain of the details of construction of the elevating mechanism are shown in Figures 7 and 8. Screw 20 is positioned in a vertically extending space 105 in the side walls of lower shell 2 and is supported by a collar 106, which is held in place by a set screw 108 and which rests upon a thrust bearing 104. Bearing 104 is mounted in the frame of lower shell 2 and the upper end of screw 20 is held in alignment by a similarly mounted ball-bearing unit 102.

Mounted upon the inner surface of upper shell 10 and extending through a slot 112 (see also Figure 8) in the side of lower shell 2, is elevating lug 22, which is provided with two spaced collars 110 (Figure 7) threaded on screw 20. Extending along the inner sides of slot 112 are two rubber beadings 114, which normally overlap so as to close slot 112 except where held apart by elevating lug 22. As elevating lug 22 moves up and down along screw 20, beadings 114 are displaced in the manner shown in Figure 8, but at the same time they provide a substantial seal for space 105. A channel 111 forms one wall of space 105 and permits unobstructed movement of lug 22.

Shaft 20 extends downwardly from collar 106 and is mechanically connected through worm 29 and cooperating gear 31 with shaft 26.

Referring again to Figure 2, positioned in upper chamber 12 is a clothes cabinet 96, which is connected by a pair of hinges 98 to frame member 97 of the upper shell 10. Cabinet 96 is provided at its front with a door having a mirror (not shown) therein and at its two lower rear corners with a pair of supporting rollers 101. Mounted upon the floor in alignment with rollers 101 are two wedge-shaped stop members 99, which act as stops for the rollers, and, at the same time, assist in supporting the cabinet. When the upper shell is elevated cabinet 96 may be used as a clothes cabinet and it is held in position by hinges 98, rollers 101 and stop members 99. When the upper shell starts moving downwardly, rollers 101 move to the left (Figure 2) off of and away from stop members 99 and along the floor to the position shown in Figure 3. Garments hanging in cabinet 96 when it is in the position shown in Figure 2 are thus carefully laid in the horizontal position without danger of injury thereto.

In the modified form of this structure, shown in Figure 12, cabinet 276 is provided with a pair of rollers 278 at its two rear corners, and with a pair of rollers 280 at its front corners, and is hinged to frame 98 by hinges 97. When the upper shell is elevated, cabinet 276 is supported by hinges 97 and by rollers 280, and when shell 10 starts moving downwardly rollers 280 automatically move to the left along the floor. Subsequently cabinet 276 is turned so that rollers 278 contact the floor, and rollers 280 are lifted from the floor. Upon further movement of the shell downwardly rollers 278 cooperate with hinges 97 to support the cabinet in same manner as do rollers 101 in the preferred embodiment.

Reverting to Figure 2, to the right of clothes cabinet 96 is positioned a collapsible shower generally indicated by the numeral 120. Shower 120 is formed by a pan-shaped base 122, preferably square, and a plurality of sections 120a, 120b, etc., also square, and of graduated sizes, the lower section 120a being adapted to nest within base 122, and the next section 120b being adapted to nest within section 120a, etc., in the manner shown in Figure 3. Each section is provided with an outwardly extending flange on its lower edge and an inwardly extending flange on its upper edge, and base 122 is provided with an inwardly extending flange around its upper edge. The shower is supported in its extended position by a tank 124 secured to the roof of upper shell 10 and having an outwardly extending flange cooperating with the inwardly extending flange on the top of section 120f. As best shown in Figure 3, when the upper shell is lowered, tank 124 fits within the center of the nested sections of the shower. Referring to Figure 5, the side of shower 120 is provided with an opening which is formed by cutting away a portion of each of the sections 120a, 120b, etc. This opening is covered by a shower curtain 126 which hangs from the lower edge of tank 124. Water is supplied to tank 124 through a flexible pipe (not shown) which extends from lower shell 2; referring again to Figures 2 and 3, a drain pipe 123 extends from pan 122 down through the wall of lower shell 2.

Turning now to Figure 5, adjacent shower 120 and hinged at its top to upper shell 10 is a mirror 128, and directly beneath the mirror is positioned a hemispherical wash basin 130 having a downwardly extending hood 131 surrounding it. Hinged to the back of the mirror at 134 (see also Figure 9) is a U-shaped connecting link or frame 132; the other end of frame 132 is hinged to wash basin 130 at 136. Below hood 131 and supported thereby is a skirt 133 formed by a plurality of sections similar to the sections 120a, 120b, etc., of shower 120. As shown in Figure 10, these sections of skirt 133 nest around wash basin 130 within hood 131 when the units are in the nested position.

Wash basin 130 is supported by three bracket constructions of the type shown in Figure 11. Thus three brackets 138 are mounted on wash basin 130, one positioned near each of the upper rear corners of skirt 131, and one positioned near the center of the bottom of the skirt; these brackets cooperate with brackets 140 mounted upon upper shell 10. When the units are in the nested position of Figure 10 brackets 138 and 140 are out of cooperating relationship and mirror 128 and frame 132 are folded and rest upon the top of wash basin 130. As upper shell 10 starts moving upwardly the upper end of mirror 128 is lifted and the mirror and the frame 132 are moved to the position shown in broken lines (Figure 10). During this movement wash basin 130 remains stationary upon the floor, and by holding one end of frame 132 stationary it assists in properly positioning mirror 128.

Simultaneously with the proper positioning of mirror 128 brackets 140 engage brackets 138 and upon further movement of shell 10 upwardly mirror 128 and wash basin 130 are raised as a unit to the position shown in Figure 9. Attached to the bottom of wash basin 130 is a flexible drainpipe 146 which empties into drainpipe 123 which extends from shower 120. When the wash basin is moved to the position shown in Figure 10 drainpipe 146 moves downwardly into the side wall of lower shell 2. Water is supplied to wash basin 130 through a flexible pipe connection (not shown) with water tank 124. At the two lower corners of skirt 131 are two inverted brackets 340 and mounted upon the floor are two brackets 338; when the basin moves to the position shown in Figure 10 these brackets move into engagement with each other and hold the basin from sideward movement.

At the left of wash basin 131 (Figure 9) and supported by the top of upper shell 10 and the floor of upper chamber 12 is a collapsible chest of drawers 152. Chest 152 comprises a plurality of sections 154a, 154b, 154c and 154d, and a linkage supporting construction. The linkage supporting construction comprises two pairs of links (only one pair being shown), each pair comprising a link 156 and a link 158 which are attached at their upper ends to a mounting member 160 rigidly carried by the roof of upper shell 10. Each link 158 is connected to mounting frame 160 by a pivot 162 and to sections 154a, 154b, 154c, and 154d, by pivots 164a, 164b, 164c, and 164d, respectively. In a like manner each link 156 is connected to mounting frame 160 by a pivot 166 and to sections 154a, 154b, 154c, and 154d by pivots 168a, 168b, 168c, and 168d, respectively. Upon the lower end of each link 156 is a roller 150, which assists in supporting chest 152.

Each of sections 154a, 154b, 154c, and 154d, comprises a frame supporting a drawer (not shown) which may be slid out of the left (Figure 9), when the shell is elevated. Links 156 and 158 are not vertical and rollers 150 are positioned slightly to the left of their respective pivots 166. When shell 10 is lowered rollers 150 automatically move to the left along the floor and the various units move to the position shown in Figure 10. Pivots 168a, 168b, 168c, and 168d, and 166, as well as pivots 164a, 164b, 164c, and 164d, and 162, are equally spaced along their respective links. Furthermore, the pivots at each end of each section (for example, pivots 168a and 164a), are vertically and horizontally spaced the same as the corresponding vertical and horizontal spacing between pivots 166 and 162. Thus, as shell 10 moves downwardly from the position of Figure 9 each section is moved to the left and down, first to the position shown in broken lines (Figure 10) and then to the position shown in full lines. During this movement each section remains upright and the drawers carried by the various sections remain horizontal. In this manner a chest of drawers is provided which extends vertically and may be used without inconvenience when the upper shell is elevated, but which automatically moves to a horizontally extended position when the shell is lowered. In this embodiment mounting member 160 is in the form of a box or chest and is provided at its front side with a door (not shown) hinged along the top.

Figure 4:
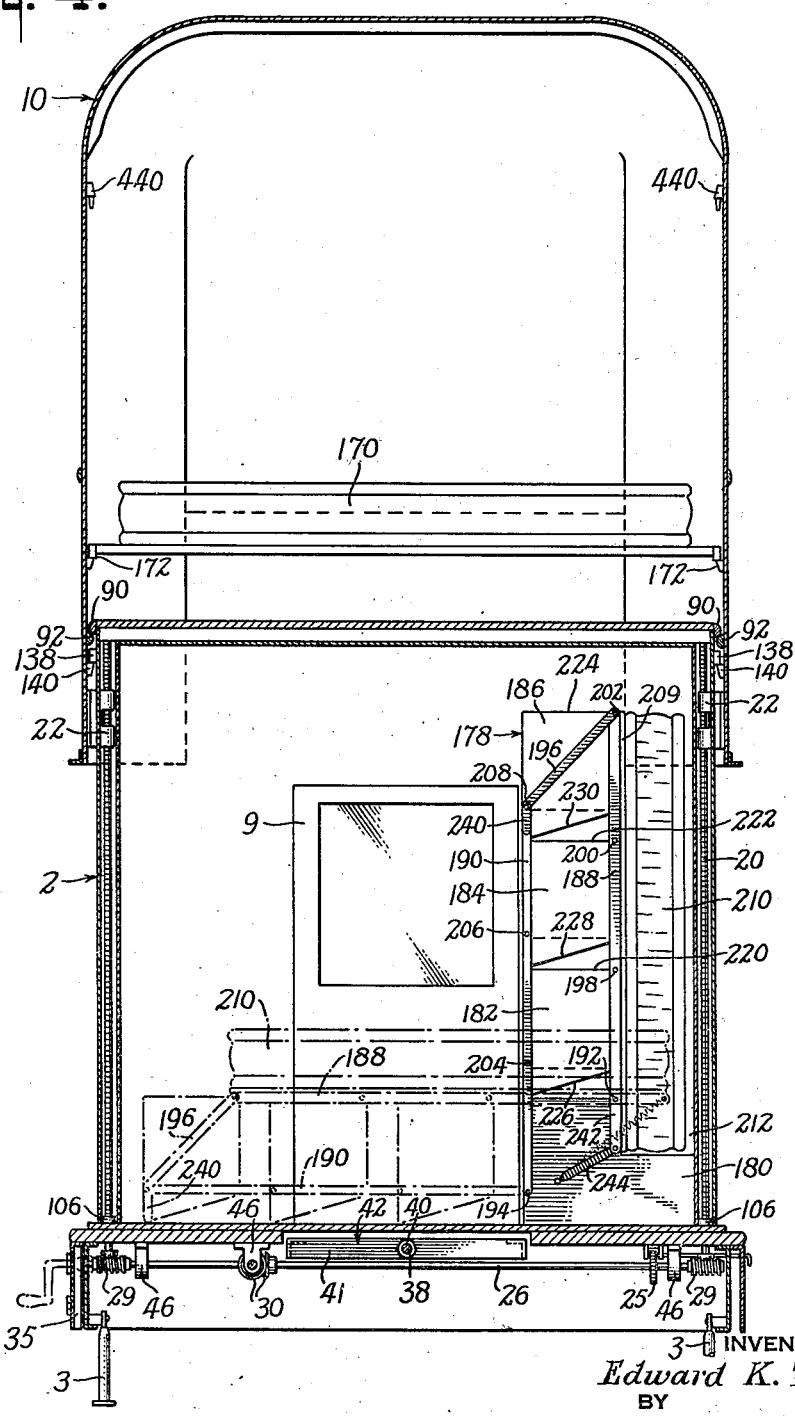
Figure 4 is a section view on the lines 4—4 of Figure 2.

As best shown in Figures 2, 3, and 4, positioned in the rear (to the left of Figures 2 and 3) of upper compartment 12, is a bed 170. Bed 170 is supported by four bracket structures 172, (Figures 2 and 4) of the type which support wash basin 130, shown best in Figure 11. When shell 10 is in the nested position of Figure 3, bed 170 rests upon the floor, and the two elements of each bracket 172 are disengaged. As shell 10 approaches the elevated position of Figures 2 and 4, the elements of brackets 172 interengage at a proper time to lift bed 170 to the position shown.

As shown at the center of Figure 2, a trap door 174, hinged along the side, provides access to upper chamber 12. When the upper shell is being lowered, this door is closed and is flush with the floor. In this embodiment when the units are in the nested position of Figure 3, clothes cabinet 96 is positioned over this trap door to prevent unwarranted access to the upper chamber. In the lower compartment a stairway 176 communicates with the opening. The lower portion of the stairway is shaped to provide a cabinet which may be used for storage space or for service equipment.

Positioned at the rear (left) of the lower compartment is a folding unit, generally indicated by the numeral 178, which is a combination bed, bookcase, chest of drawers, and writing desk. Unit 178 is made like chest of drawers 152 (shown in Figures 9 and 10), but is supported at the bottom (Figure 4). Unit 178 comprises a base section 180, and three movable sections 182, 184, and 186, which are supported at their ends by a linkage construction. This linkage construction comprises a pair of links 188 and 190, at each end, which are pivoted to base 180 by pivots 192 and 194, respectively; sections 182, 184 and 186 are connected to link 188 by pivots 198, 200, and 202, and to link 190 by pivots 204, 206, and 208, respectively. The upper ends of each pair of links 188, 190 are pivotally connected by a brace 196. At the rear side of unit 186 upon a rigid frame 209 carried by links 188 is removably attached a mattress 210, the lower end of which fits in a suitable recess 212.

Referring again to Figure 3, base section 180 is shown provided with a large drawer 214 and two small drawers 216. Sections 182, 184, and 186 are in the form of box-like frames, with vertical back and end walls (see also Figure 4), and with horizontal upper walls 220, 222, and 224, respectively; the bottom walls 226, 228, and 230 are not horizontal but extend upwardly and to the rear. Thus, a space is provided between the top of section 180 and wall 226 of section 182 which is hidden when the unit is in the position shown; corresponding spaces are provided between walls 220 and 228 and walls 222 and 230.

Each of the sections is also provided with a horizontally disposed false bottom, which extends forward from the rear edge of the inclined bottom wall. The space in section 182 between the false bottom and its upper wall 220 forms a storage compartment and a door 232 (Figure 2) is hinged at its lower edge so that it may be opened to a horizontal position to provide a writing desk. The corresponding space in section 184 is fitted with four drawers 234, and the corresponding space in section 186 is provided with a glass door 236, hinged at the top so that it may be used as a bookshelf. The space 237 below writing desk 232 is adapted for the storage of materials such as pencils, pens, etc. Above and below drawers 234 are provided small drawers 238.

Referring again to Figure 4, unit 178 may be moved from the position shown in full lines to the position shown in broken lines, thus swinging the links 188 and 190 about their respective pivots 192 and 194. Braces 196 are provided with angular extensions 240, which are flush with their respective links 190 when the unit is in the elevated position, but which extend downwardly to form legs when the unit is moved to the position shown in broken lines. Extensions 240 thus acting as legs, cooperate with pivots 194 and 192 to give rigid support to the unit so that it may be used as a bed.

Each of links 188 is provided at its lower end with an extension 242, to the extremity of which is attached a coil spring 244, the other end of each coil spring being attached to base 180. Coil springs 244 balance the weight of the unit to facilitate operation. When the unit is being moved to and from the position shown in broken lines, sections 182, 184, and 186 are held upright and any material within the various compartments is not molested.

Referring again to Figure 1, the main body section 2 is provided near its front with a door 7 and at its rear with a door 9 (see Figure 4), which opens onto the rear porch. Suitable windows 11 (Figure 1) are also provided which slide downwardly between the body walls. The upper section is provided with windows 13 and a door 15 which match with windows 11 and door 7, respectively, when upper shell 10 is in the nested position. Door 15 is slightly larger than door 7 so that it may be opened with door 7 when the upper shell is in the nested position. Door 15 is provided with a safety latch which is effective when the upper shell is elevated, to prevent accidental opening of this door.

As various embodiments might be made of this invention, and as various changes might be made in the construction herein described, all without departing from the scope of the invention, it is to be understood that all matter herein set forth or shown in the accompanying drawings is to be interpreted as illustrative and not in a limiting sense.

I claim:

1. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a cabinet construction hinged to said roof and having a roller engaging the second named of said floors, said cabinet construction being so related to said shell that it will be moved to a vertical position when said shell is elevated and so that it will be moved to a horizontal position when said shell is moved downwardly.

2. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a mounting means carried by said upper shell having two horizontal lines of pivotal connection spaced vertically and horizontally a predetermined distance apart; a cabinet construction comprising a plurality of sections and a supporting frame including four parallel bar members, two of said bar members being connected at their ends to said mounting means upon one of said horizontal lines and being connected to the opposite ends of each of said sections, the other two of said bar members being connected at their ends to said mounting means upon the other of said horizontal lines and to the opposite ends of each of said sections, the connection between each end of each section and the bar members attached thereto being horizontally and vertically spaced said predetermined distance apart.

3. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; equipment means positioned between said roof and said second named of said floors; and interengaging means including an element attached to said upper shell and an element attached to said equipment means so positioned that they will interengage to raise said equipment means when said shell is elevated.

4. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; equipment means positioned between said roof and said second named of said floors; and interengaging means comprising a tapered male member and a female member adapted to receive said male member, one of said members being attached to said shell and the other of said members being attached to said equipment means so positioned that they will interengage to raise said equipment means when said shell is elevated.

5. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a bed positioned between said roof and the second named of said floors; a plurality of interengaging means including a plurality of members mounted upon said upper shell and a plurality of members mounted upon said bed so related that they will interengage when said shell is elevated and said bed will be properly positioned for use.

6. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a mirror and a wash basin positioned between said roof and the second named of said floors; means hingedly attaching said mirror to said upper shell and to said wash basin; and interengaging means including a member attached to said upper shell and a member attached to said wash basin to move said wash basin to its proper position when said shell is elevated.

7. In apparatus of the general nature of that described, a base member, a ceiling and wall construction adapted to be moved from a nested position adjacent said base member to an elevated position, a mirror hingedly attached along its upper edge to said ceiling and wall construction, a wash basin, a link attached to said wash basin, said link having one end attached to the edge of said wash basin and the other end thereof attached to said mirror at a point spaced from the top of said mirror a distance equal to the length of said link.

8. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a collapsible porch construction mounted upon said lower shell, said porch construction being extendable for use and being collapsible to be enclosed by said upper shell when said upper shell is in its lower position.

9. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a collapsible porch construction mounted to be moved from a collapsed position to a position for use; and means to move said porch to and from said position for use, said last named means being operable simultaneously with the means to elevate said upper shell.

10. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a collapsible porch construction mounted upon said lower shell; means to move said porch to its extended position for use when said upper shell is elevated; a lid hinged along its upper edge to said upper shell, and means to swing said lid outwardly and hold said lid horizontally over said porch when said porch is moved to its extended position.

11. In a porch construction, a plurality of horizontally positioned supporting beams; a base structure slidably mounting said beams to move to and from their extended position; a floor construction comprising a plurality of sections hingedly attached and adapted to collapse when said supporting beams move from said extended position; a railing construction including, a hollow vertical post rigidly supported by said supporting beams, and a flexible rope adapted to form a horizontal rail extending from the top of said post; and means to draw a portion of said rope into said post when said supporting beams are moved from their extended position.

12. In a telescopic trailer, a lower shell having a floor and a side wall and ceiling construction; an upper shell having a roof and side members mounted to move to a lower position down over said lower shell; means to elevate said upper shell to form an upper room the floor of which is formed by said ceiling construction; a collapsible shower cabinet comprising a plurality of horizontal sections which are adapted to nest one within another when said upper shell is in its lower position, said sections being adapted to interengage and form a shower cabinet when moved from the nested position; and interengaging means upon said upper shell and one of said sections to move said sections to the extended position when said upper shell is raised.

13. In a telescopic trailer, a lower shell having a floor and a side wall and ceiling construction; an upper shell having a roof and side members mounted to move to a lower position down over said lower shell; means to elevate said upper shell to form an upper room the floor of which is formed by said ceiling construction; a collapsible shower cabinet comprising a plurality of horizontal sections which are adapted to nest one within another when said upper shell is in its lower position, said sections being adapted to interengage and form a shower cabinet when moved from the nested position; a tank carried by said upper shell and interengaging one of said sections to move said sections to the extended position when said upper shell is raised; certain of said sections being cut away to permit entry to said cabinet.

14. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a cabinet construction hinged to said roof and having roller means engaging the second named of said floors, said cabinet construction being so related to said shell that it will be moved to a vertical position when said shell is elevated and so that it will be moved to a horizontal position when said shell is moved downwardly; and wedge means on the second named of said floors positioned to be engaged by said roller means when said cabinet is substantially in its vertical position.

15. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a cabinet construction having a front side and a back side and hinged on a transverse axis at its top to said roof, said cabinet construction having a first roller means at its rear lower edge and a second roller means positioned upon its front lower edge, said cabinet construction being so related to said shell that it will be moved to a vertical position when said shell is elevated and so that it will be moved to a horizontal position when said shell is moved downwardly, said first roller means engaging the second named of said floors during the major portion of the movement of said cabinet, and said second roller means being positioned to extend below said first roller means and engage the second named of said floors when said cabinet approaches its vertical position.

16. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a fixed cabinet section rigidly mounted on said roof having two substantially vertical parallel end walls and having two horizontal lines of pivotal connection spaced vertically and horizontally a predetermined distance apart; a plurality of movable cabinet sections each having end walls substantially in the planes of the end walls of said fixed cabinet section; and a supporting frame comprising four parallel bar members pivotally attached in pairs to the respective end walls of each of said sections, one bar of each pair being connected at its end to the respective end wall of said fixed cabinet section along each of said horizontal lines of pivotal connection, the connections between each end of each section and the bar members attached thereto being spaced apart horizontally and vertically said predetermined distance.

17. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; equipment means positioned between said roof and said second named of said floors; and interengaging means including an element attached to said upper shell and an element attached to said equipment means so positioned that they will interengage to raise said equipment means when said shell is elevated, and said interengaging means also including a plurality of pairs of interengaging elements, one element of each pair being attached to said upper shell and the other element of each pair being attached to said lower shell and the relative positions of each element of the various pairs being such that they interengage when said upper shell is elevated.

18. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; equipment means positioned between said roof and said second named of said floors; and interengaging means including an element attached to said upper shell and an element attached to said equipment means so positioned that they will interengage to raise said equipment means when said shell is elevated, and said interengaging means also including a plurality of pairs of interengaging elements, one element of each pair being attached to said upper shell and the other element of each pair being attached to said lower shell, and the relative positions of each element of certain of the various pairs being such that they interengage when said upper shell is elevated and the relative positions of each element of the remainder of the various pairs being such that they interengage when said upper shell is lowered.

19. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a collapsible porch construction mounted upon said lower shell, said porch construction having a floor formed by two sections, one section of which is hinged along the bottom of the back wall of said lower shell and being hinged along its opposite edge to one edge of the other of said sections, a frame construction supporting said sections including a plurality of hinged legs and a screw and lug unit operable to move said operating unit to a position substantially under said floor to thereby collapse said porch construction so that it is enclosed by said upper shell when said upper shell is in its lower position.

20. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a collapsible porch construction mounted upon said lower shell, said porch construction having a floor formed by two sections, one section of which is hinged along the bottom of the back wall of said lower shell and being hinged along its opposite edge to one edge of the other of said sections, a collapsible frame construction supporting said sections including a plurality of hinged legs, and interengaging cam means upon said supporting frame and said floor to raise the joined edges of said sections upon the initial collapsing movement of said frame construction from the fully extended position.

21. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction, said means comprising four vertically extending male screws each of which carries a cooperating elevating lug and means to rotate said male screws simultaneously; a collapsible porch construction mounted to be moved from a collapsed position to a position for use; and means to move said porch to and from said position for use, said last named means comprising a horizontal male screw and lug unit mechanically interconnected with said four vertical male screws to be operable simultaneously with the means to elevate said upper shell.

22. In a telescopic trailer, a lower shell having a floor and side wall and ceiling construction; an upper shell having a roof and side members mounted to move to a lower position over said lower shell; means to elevate said upper shell to form an upper room the floor of which is formed by said ceiling construction; a collapsible porch construction mounted upon said lower shell; means to move said porch to its extended position for use when said upper shell is elevated; a lid hinged along its upper edge to said upper shell, and means including a vertically extending cam construction and a hinged awning to swing said lid outwardly and hold said lid substantially horizontally over said porch when said porch is moved to its extended position.

EDWARD K. THOMAS.